(12) United States Patent
Kim et al.

(10) Patent No.: US 8,428,323 B2
(45) Date of Patent: Apr. 23, 2013

(54) METHOD OF PROCESSING MEDICAL IMAGE OF BLOOD VESSEL USING IMAGE FUSION METHOD

(75) Inventors: Sung Min Kim, Goyang-si (KR); Kwang Yong Shin, Seoul (KR); Young Ho Park, Bucheon-si (KR); Hyeon Chang Lee, Seoul (KR); So Ra Cho, Suwon-si (KR); Eui Chul Lee, Seoul (KR); Gang Ryung Park, Seoul (KR)

(73) Assignee: Dongguk University Industry-Academic Cooperation Foundation, Seoul (KR)

( * ) Notice: Subject to any disclaimer, the term of this patent is extended or adjusted under 35 U.S.C. 154(b) by 0 days.

(21) Appl. No.: 13/519,470

(22) PCT Filed: Feb. 1, 2012

(86) PCT No.: PCT/KR2012/000792
§ 371 (c)(1),
(2), (4) Date: Aug. 7, 2012

(87) PCT Pub. No.: WO2012/157835
PCT Pub. Date: Nov. 22, 2012

(65) Prior Publication Data
US 2013/0028490 A1    Jan. 31, 2013

(51) Int. Cl.
*G06K 9/00* (2006.01)
(52) U.S. Cl.
USPC ............ 382/128; 382/260; 382/263; 382/254
(58) Field of Classification Search .................. 382/128, 382/254, 260, 263
See application file for complete search history.

(56) References Cited

U.S. PATENT DOCUMENTS

| | | | |
|---|---|---|---|
| 7,352,884 B2* | 4/2008 | Abe ............................... | 382/130 |
| 8,164,039 B2* | 4/2012 | Bovik et al. ................. | 250/208.1 |
| 2004/0086175 A1* | 5/2004 | Parker et al. .................. | 382/154 |
| 2006/0083438 A1* | 4/2006 | Donomae et al. ............. | 382/254 |
| 2010/0172558 A1* | 7/2010 | San Jose Estepar et al. . | 382/131 |

FOREIGN PATENT DOCUMENTS

| | | |
|---|---|---|
| JP | 2003-196664 A | 7/2003 |
| KR | 10-2007-0017763 A | 2/2007 |
| KR | 10-2009-0087895 A | 8/2009 |
| KR | 10-0940902 B1 | 2/2010 |

OTHER PUBLICATIONS

J. H. Kim, "An Image Merging Method for Two High Dynamic Range Images of Different Exposure," Korea Multimedia Society, 2010.
Z. Shi., W. Yiding, and W. Yunhong, "Extracting Hand Vein Patterns from Low-quality Images: A New Biometric Technique Using Low-cost Devices," Proceedings of the Fourth International Conference on Image and Graphics, 2007.
Lingyu and L. Graham, "Gray-scale Skeletonization of Thermal Vein Patterns Using the Watershed Algorithm in Vein Pattern Biometrics," in Proceedings of the International Conference on Computational Intelligence and Security, 2006.

* cited by examiner

*Primary Examiner* — Tom Y Lu
(74) *Attorney, Agent, or Firm* — The Webb Law Firm

(57) ABSTRACT

A method of processing a blood vessel image is provided. The method includes (a) sharpening an original blood vessel image using a Gabor filter in consideration of various directions and thicknesses of blood vessels included in the blood vessel and (b) detecting edges according to a change in brightness in a blood vessel domain and a non-blood vessel domain of the original blood vessel image and the blood vessel image on which the Gabor filtering step is completed, using an edge extraction method based on a first-order differentiation or second-order differentiation.

7 Claims, 5 Drawing Sheets

(a) ORIGINAL BLOOD VESSEL IMAGE (b) BLOOD VESSEL IMAGE TO WHICH GABOR FILTER IS APPLIED (c) BLOOD VESSEL IMAGE IN WHICH EDGES ARE DETECTED (d) BLOOD VESSEL IMAGE IN WHICH EDGES ARE DETECTED

METHOD OF PROCESSING MEDICAL IMAGE OF BLOOD VESSEL USING IMAGE FUSION METHOD

CROSS-REFERENCE TO RELATED APPLICATION

This application claims priority to and the benefit of Korean Patent Application No. 2011-0045782, filed May 16, 2011, the disclosure of which is incorporated herein by reference in its entirety.

BACKGROUND

1. Field of the Invention

The present invention relates to a method of processing a medical image of a blood vessel, and more particularly, to a method of processing a medical image of a blood vessel that includes applying a Gabor filter to a photographed original blood vessel image in consideration of directions and thicknesses of blood vessels, detecting blood vessel edges in the original blood vessel image and the blood vessel image to which the Gabor filter is applied, fusing the blood vessel image with a blood vessel image in which edges are detected using a neural network sharpening the blood vessel image, and processing the fused blood vessel image using score level fusion so that the blood vessels included in the blood vessel image can be observed more clearly.

2. Discussion of Related Art

In general, a method of obtaining a blood vessel image of a body part such as fingers and the back of the hand has been performed using a radiographic method such as magnetic resonance imaging (MRI), computed tomography (CT), etc.

However, the radiographic methods are problematic because they require a user to take a contrast agent, which makes radiography troublesome and may cause side effects in some users, and it is too expensive to be used for general diagnostic and therapeutic purposes.

In order to solve these problems of radiographic methods, an infrared imaging method using infrared (IR) lighting and an IR camera has been developed as an alternative method for obtaining a blood vessel image.

The infrared imaging method may be used to analyze a blood vessel domain and a non-blood vessel domain from a blood vessel image, since the blood vessel domain is photographed relatively dark, because near-infrared light used to obtain the blood vessel image is absorbed into the hemoglobin included in blood in the blood vessel.

In particular, the infrared imaging method has advantages in that it is less objectionable than MRI or CT, is inexpensive, and has no side effects. Therefore, the infrared imaging method has been widely used in the field of medical imaging to diagnose vessel occlusion caused by arteriosclerosis or to determine whether blood vessels in a joint are correctly joined after incising a body part such as fingers during surgery.

Meanwhile, in order to make an accurate diagnosis and a medical examination in the field of medical imaging using a blood vessel image obtained by the infrared imaging method, a blood vessel domain and a non-blood vessel domain of the obtained blood vessel image have to be clearly observed. Therefore, improving the quality of the blood vessel image using an image sharpening method is essential.

As one example of an attempt to improve the image quality, J. H. KIM, "An Image Merging Method for Two High Dynamic Range Images of Different Exposure," (Korea Multimedia Society, 2010), discloses that an image is sharpened by obtaining two high dynamic range (HDR) images from an immobilized object at different exposure times, determining a weight value using information such as luminance and chromaticity during combination of the two HDR images, and applying the weight value to the Gaussian function so as to prevent generation of noise that can be caused by a change in the weight value.

However, the method has problems in that it is difficult to predict rotation and movement between the two blood vessel images since the rotation and movement between the two blood vessel images may be caused by a movement of the user, it takes a long processing time to match the blood vessel images, and it is difficult to apply as a method of sharpening a blood vessel image since distortion of a blood vessel domain may be caused by inaccurate matching when the two obtained blood vessel images are obtained from a body part.

Also, as another example of processing a blood vessel image, Z. Shi., W. Yiding, and W. Yunhong, "Extracting Hand Vein Patterns from Low-quality Images: A New Biometric Technique Using Low-cost Devices," Proceedings of the Fourth International Conference on Image and Graphics, 2007, discloses an attempt to sharpen a blood vessel image by removing noise of an image using a matched filter, a Wiener filter and an average filter.

However, the method has a problem in that an image processed by filtration using a plurality of filters becomes out of focus, and thus a blood vessel and a non-blood vessel may be separated inaccurately during the separation of the blood vessel and the non-blood vessel.

In order to solve these problems, W. Lingyu and L. Graham, "Gray-scale Skeletonization of Thermal Vein Patterns Using the Watershed Algorithm in Vein Pattern Biometrics," in Proceedings of the International Conference on Computational Intelligence and Security, 2006, proposes a method of extracting a framework of an image by replacing separation of a blood vessel and a non-blood vessel in the image with a watershed algorithm.

However, this method has a problem in that it is difficult to distinguish between two blood vessels when they are adjacent to each other.

SUMMARY OF THE INVENTION

The present invention is directed to providing a method of processing a medical image of a blood vessel which is able to improve the qualities of a blood vessel image. Here, the method includes amplifying a signal of a blood vessel domain using a Gabor filter in consideration of a plurality of directions and thicknesses, detecting edges from an original blood vessel image and a blood vessel image to which the Gabor filter is applied, fusing the blood vessel image with the edge image using a neural network to sharpen the blood vessel images, obtaining a plurality of sharpened blood vessel images from one blood vessel image by sharpening the sharpened blood vessel images using a score level fusion, and clearly distinguishing a blood vessel and a non-blood vessel in the blood vessel image.

One aspect of the present invention provides a method of processing a blood vessel image, including:

i) a Gabor filtering step to sharpen an original blood vessel image using a Gabor filter in consideration of various directions and thicknesses of blood vessels included in the blood vessel image;

ii) an edge detection step to detect edges according to a change in brightness of a blood vessel domain and a non-blood vessel domain of the original blood vessel image and the blood vessel image on which the Gabor filtering step of Step i) is completed, using an edge extraction method based on a first-order differentiation or second-order differentiation;

iii) a blood vessel image sharpening step to fuse the original blood vessel image with the blood vessel image on which the edge detection step of Step ii) is completed, fusing the blood vessel image on which the Gabor filtering step of Step i) is completed with an edge blood vessel image detected in the image to which the Gabor filter of Step ii) is applied, determining weight values which can be applied to the pixels of the two fused images using a neural network, and fusing the two images to sharpen the blood vessel image, wherein the blood vessel image sharpening step is performed using the neural network; and iv) a blood vessel image sharpening step to sharpen the blood vessel image on which the Gabor filtering step of Step i) is completed and the blood vessel image sharpened through the neural network of Step iii) using a score level fusion method, wherein the blood vessel image sharpening step is performed through a score level fusion.

BRIEF DESCRIPTION OF THE DRAWINGS

The above and other objects, features and advantages of the present invention will become more apparent to those of ordinary skill in the art by describing in detail the exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but it can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and similarly, a second element could be termed a first element, without departing from the scope of the exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the exemplary embodiments. The singular forms "a," "an" and "the" are intended to include the plural forms as well, unless the context clearly indicates otherwise. It will be further understood that the term "comprises," "comprising," "includes" and/or "including," when used herein, specify the presence of the stated features, integers, steps, operations, elements, components and/or groups thereof, but do not preclude the presence or addition of one or more other features, integers, steps, operations, elements, components and/or groups thereof.

With reference to the appended drawings, the exemplary embodiments of the present invention will be described in detail below.

The present invention provides a method of processing a blood vessel image including i) a Gabor filtering step to sharpen an original blood vessel image using a Gabor filter in consideration of various directions and thicknesses of blood vessels included in the blood vessel image; ii) an edge detection step to detect edges according to a change in brightness in a blood vessel domain and a non-blood vessel domain of the original blood vessel image and the blood vessel image on which the Gabor filtering step of Step i) is completed, using an edge extraction method based on a first-order differentiation or second-order differentiation; iii) a blood vessel image sharpening step to fuse the original blood vessel image with the blood vessel image on which the edge detection step of Step ii) is completed, fusing the blood vessel image on which the Gabor filtering step of Step i) is completed with an edge blood vessel image detected in the image to which the Gabor filter of Step ii) is applied, determining weight values which can be applied to the pixels of the two fused images using a neural network and fusing the two images to sharpen the blood vessel image, wherein the blood vessel image sharpening step is performed using the neural network; and iv) a blood vessel image sharpening step to sharpen the blood vessel image on which the Gabor filtering step of Step i) is completed and the blood vessel image sharpened through the neural network of Step using a score level fusion method, wherein the blood vessel image sharpening step is performed through a score level fusion.

The method of processing a blood vessel image, particularly, the method of processing a medical image of a blood vessel according to the present invention, can obtain sharpened blood vessel images from a blood vessel image when a physician takes an image of a body, for example, hands, fingers, the back of the hand, toes, or blood vessels thereof, to medically examine or treat a patient. The method of processing a blood vessel image is not particularly limited as long as the method is used for this purpose.

In particular, the method of processing a blood vessel image according to the present invention can obtain a plurality of sharpened blood vessel images from one blood vessel image. Therefore, the method according to the present invention is more reliable than a typical method in which medical examination is performed using one sharpened blood vessel image and can help to observe blood vessels in the image more elaborately and clearly.

Here, the body is not limited to hands, fingers, the back of the hand, toes, or blood vessels thereof, but may include other parts according to the user's choice. In the present invention, the blood vessel image refers to a blood vessel image photographed using infrared lighting and an IR camera, as well as a blood vessel image such as a magnetic resonance imaging (MRI) image or a computed tomography (CT) image obtained using a contrast agent.

Also, the blood vessel image may refer to a subject image to be sharpened by processing an image, or a sharpened image. However, a subject image to be sharpened by processing the blood vessel image, that is, an image obtained at the very beginning, may be specifically referred to as an original blood vessel image.

Hereinafter, the present invention will be described in further detail with reference to the accompanying drawings. However, it should be understood that the description below pertains merely to a preferable example for the purpose of illustration only and is not intended to limit the scope of the invention.

Figure 1:
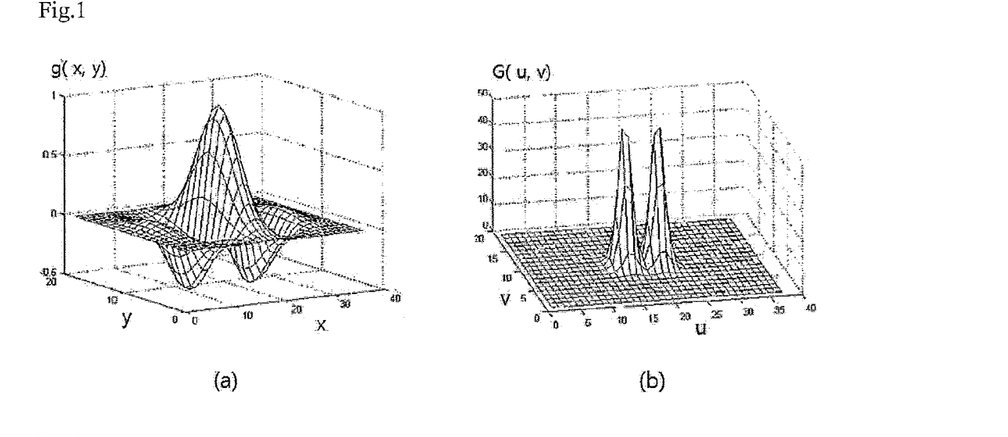
FIG. 1 is a diagram showing patterns of the spatial domain and the frequency domain of a Gabor filter according to the present invention.
Figure 2:
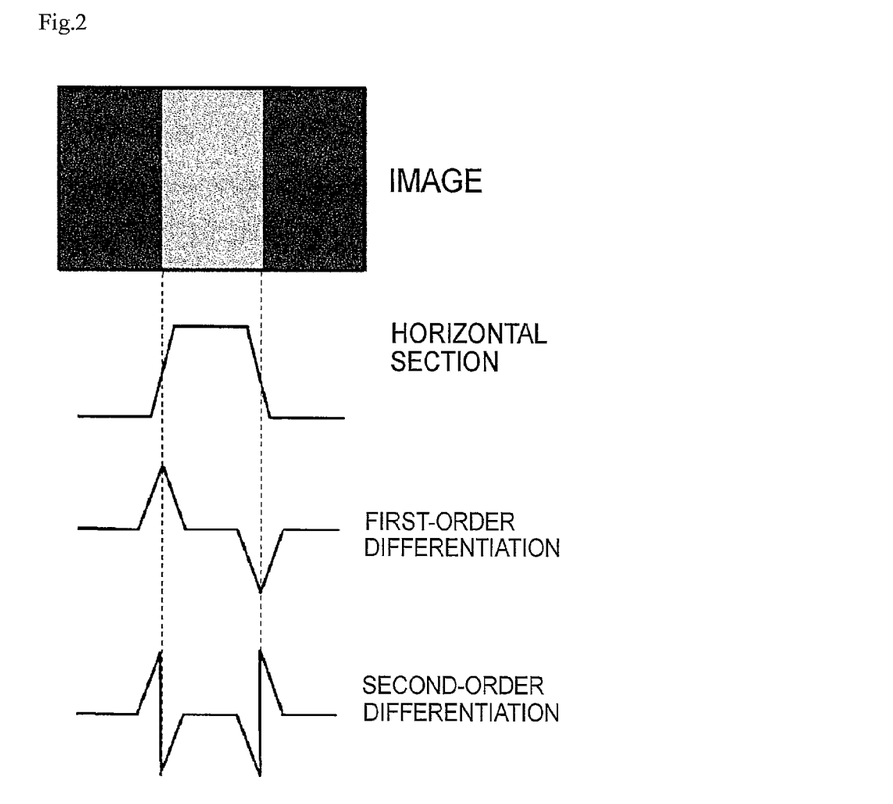
FIG. 2 is a diagram showing the shapes of the edges detected in the spatial domain in which a change in brightness of an image is induced according to a change in the differentiated value according to the present invention.
Figure 3:
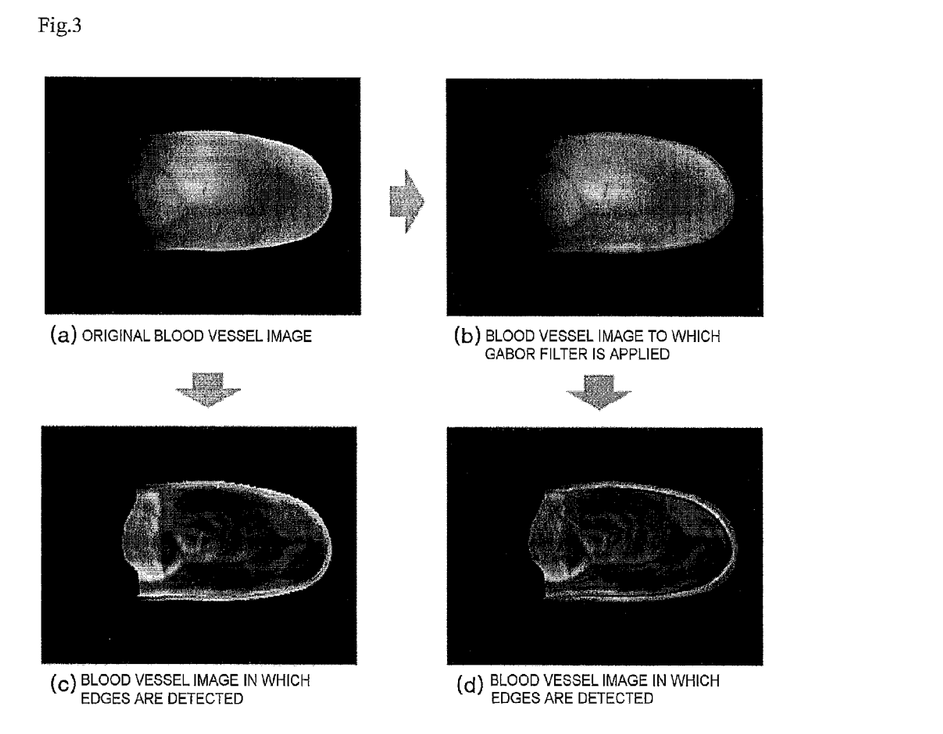
FIG. 3 is a diagram showing images to which a Gabor filter is applied in the spatial domain and the blood vessel images in which the edges are detected according to the present invention.
Figure 4:
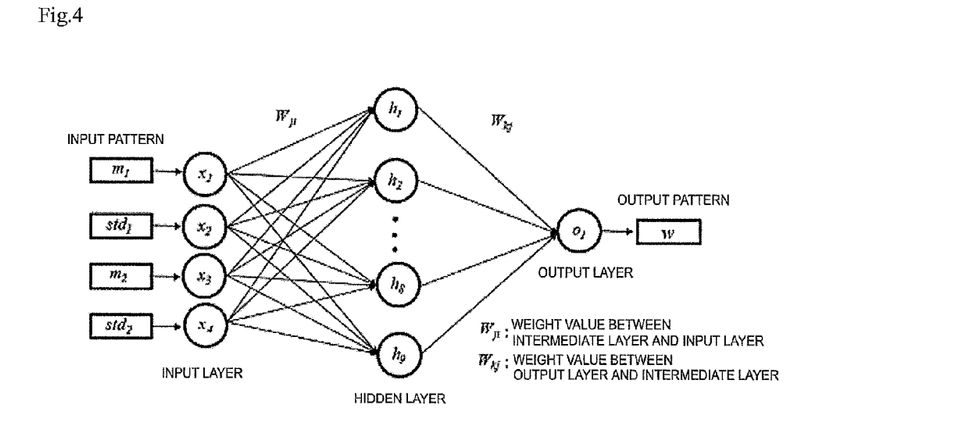
FIG. 4 is a diagram showing a neural network which is applied to fuse a blood vessel image with an image in which the blood vessel edges are detected according to the present invention.
Figure 5:
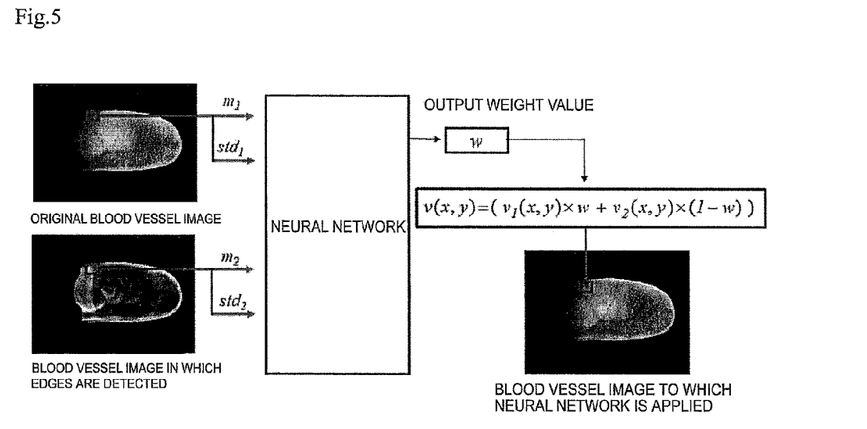
FIG. 5 is a diagram showing an step of sharpening a blood vessel image using averages and standard deviations of the original blood vessel image and the image in which the edges are detected using the neural network according to the present invention.
Figure 6:
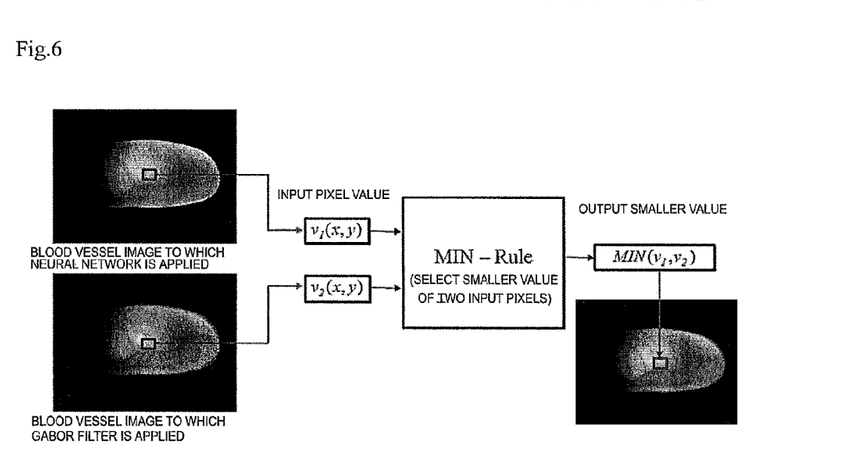
FIG. 6 is a diagram showing an step of sharpening blood vessel images to which the neural network and the Gabor filter are applied using a score level fusion of MIN according to the present invention.
Figure 7:
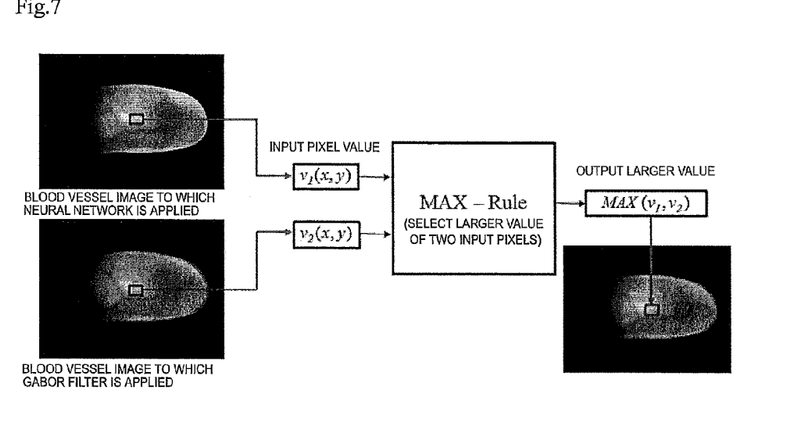
FIG. 7 is a diagram showing an step of sharpening blood vessel images to which the neural network and the Gabor filter are applied using a score level fusion of MAX according to the present invention.
Figure 8:
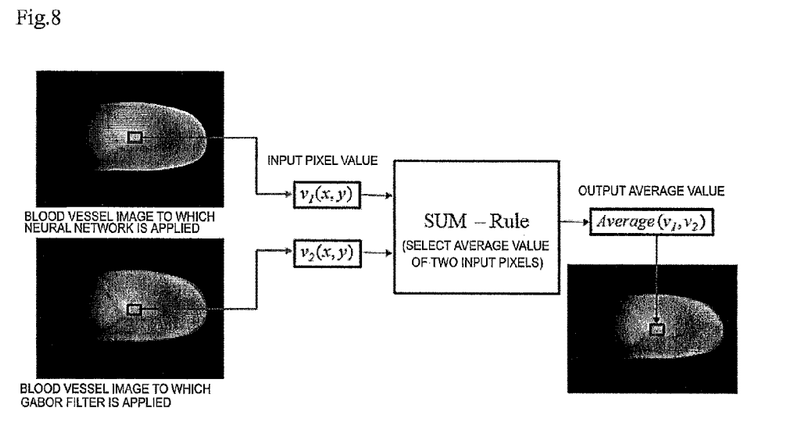
FIG. 8 is a diagram showing an step of sharpening blood vessel images to which the neural network and the Gabor filter are applied using a score level fusion of SUM according to the present invention.
Figure 9:
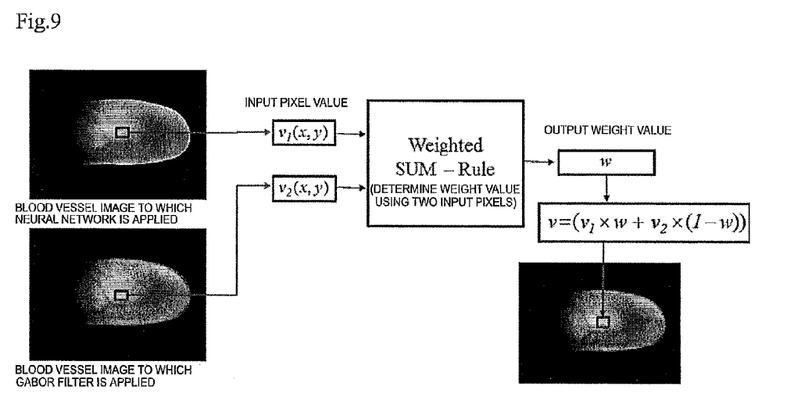
FIG. 9 is a diagram showing an step of sharpening blood vessel images to which the neural network and the Gabor filter are applied using a score level fusion of weighted SUM according to the present invention.
Figure 10:
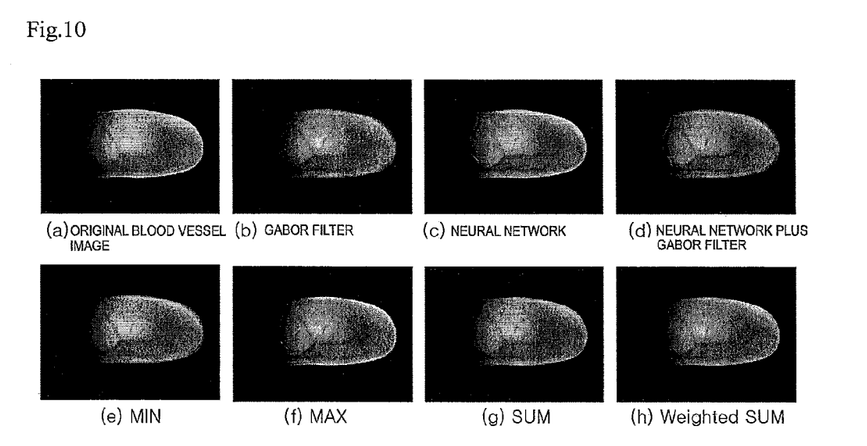
FIG. 10 is a diagram showing a plurality of blood vessel images sharpened from an original blood vessel image using a plurality of blood vessel image fusion methods according to the present invention.

FIG. 1 is a diagram showing patterns of the spatial domain and the frequency domain of a Gabor filter according to the present invention, FIG. 2 is a diagram showing the shapes of the edges detected in the spatial domain in which a change in brightness of an image is induced according to a change in the differentiated value according to the present invention, FIG. 3 is a diagram showing images to which a Gabor filter is applied in the spatial domain and blood vessel images in which edges are detected according to the present invention, FIG. 4 is a diagram showing a neural network which is applied to fuse a blood vessel image with an image in which the blood vessel edges are detected according to the present invention, FIG. 5 is a diagram showing an step of sharpening a blood vessel image using averages and standard deviations of the original blood vessel image and the image in which edges are detected using the neural network according to the present invention, FIG. 6 is a diagram showing an step of sharpening blood vessel images to which the neural network and the Gabor filter are applied using a score level fusion of MIN according to the present invention, FIG. 7 is a diagram showing an step of sharpening blood vessel images to which the neural network and the Gabor filter are applied using a score level fusion of MAX according to the present invention, FIG. 8 is a diagram showing an step of sharpening blood vessel images to which the neural network and the Gabor filter are applied using a score level fusion of SUM according to the present invention, FIG. 9 is a diagram showing an step of sharpening blood vessel images to which the neural network and the Gabor filter are applied using a score level fusion of weighted SUM according to the present invention, and FIG. 10 is a diagram showing a plurality of blood vessel images sharpened from an original blood vessel image using a plurality of blood vessel image fusion methods according to the present invention.

As shown in FIGS. 1 to 10, the method of processing a medical image of a blood vessel according to the present invention includes i) a Gabor filtering step to sharpen an original blood vessel image using a Gabor filter in consideration of various directions and thicknesses of blood vessels included in the blood vessel image; ii) an edge detection step to detect the edges according to a change in brightness in a blood vessel domain and a non-blood vessel domain of the original blood vessel image and the blood vessel image on which the Gabor filtering step of Step i) is completed, using an edge extraction method based on a first-order differentiation or second-order differentiation; iii) a blood vessel image sharpening step to fuse the original blood vessel image with the blood vessel image on which the edge detection step of Step ii) is completed, fusing the blood vessel image on which the Gabor filtering step of Step i) is completed with an edge blood vessel image detected in the image to which the Gabor filter of Step ii) is applied, determining weight values which can be applied to the pixels of the two fused images using a neural network, and fusing the two images to sharpen the blood vessel image, wherein the blood vessel image sharpening step is performed using the neural network; and iv) a blood vessel image sharpening step to sharpen the blood vessel image on which the Gabor filtering step of Step i) is completed and the blood vessel image sharpened through the neural network of Step iii) using a score level fusion method, wherein the blood vessel image sharpening step is performed through a score level fusion.

According to a certain exemplary embodiment, the method of processing a medical image of a blood vessel according to the present invention may further include a displaying step to simultaneously display the original image and the images obtained in Steps i) to iv), following Step iv).

In this case, the displaying step enables a user, particularly, a medical expert to compare and observe various kinds of imaging information at the same time so that he/she can make an accurate judgment.

The Gabor filtering step according to the present invention is to sharpen a blood vessel image using the Gabor filter.

In this case, the Gabor filter is applied in advance to a blood vessel image before performing the Gabor filtering, that is, a plurality of Gabor filters are generated in advance according to the directions and thicknesses of various blood vessels, and the generated Gabor filters are applied to a blood vessel image.

In order to generate a plurality of Gabor filters in consideration of the directions and thicknesses of various blood vessels and to apply the generated Gabor filters to a blood vessel image according to the present invention, the Gabor filters are generated and used to process an image, as represented by the following Gabor filter equation of Equation 1 and transform of the Gabor filter equation for the frequency domain of Equation 2.

$$g(x, y) = \frac{1}{2\pi\sigma_x\sigma_y} \exp\left\{-\frac{1}{2}\left[\left(\frac{x_\theta^2}{\sigma_x^2}\right) + \left(\frac{y_\theta^2}{\sigma_y^2}\right)\right]\right\}\{\cos(2\pi f_0 x_0)\} \quad \text{Equation 1}$$

$$\begin{pmatrix} x_\theta \\ y_\theta \end{pmatrix} = \begin{pmatrix} \cos\theta & \sin\theta \\ -\sin\theta & \cos\theta \end{pmatrix}\begin{pmatrix} x \\ y \end{pmatrix}$$

$$G(u, v) = \exp\left\{-\frac{1}{2}\left[\frac{(u-W)^2}{\sigma_u^2} + \frac{v^2}{\sigma_v^2}\right]\right\} \quad \text{Equation 2}$$

In Equation 1, (x, y) represents a position of the pixels in a filter, g(x, y) represents a Gabor filter coefficient at position (x, y).

Also, $f_0$ in Equation 1 represents a frequency of a Gabor filter, and $\sigma_x$ and $\sigma_y$ represent parameters such as standard deviations in the form of a Gabor filter.

In Equation 1, the patterns of the Gabor filter are determined by the parameters $\sigma_x$, $\sigma_y$, $f_0$ and $\theta$.

In this case, the parameter $\theta$ represents a direction of the Gabor filter and uses predetermined facing values of a plurality of blood vessels, and the period of the Gabor filter is set to a value that is twice the thickness of the plurality of blood vessels.

Also, since the $f_0$ (frequency of the Gabor filter) may be calculated as "1/period", $f_0$ is eventually set to "1/(twice the blood vessel thickness)".

In general, the standard deviation $\sigma_x(\sigma_y)$ is used to determine the shape of the Gabor filter, that is, $\sigma_x$ is given the same value as $\sigma_y$, and the size of the Gabor filter is given a value that is two times $\sigma_x(\sigma_y)$.

Therefore, since the direction ($\theta$) and thickness ($f_0$) of the various blood vessels are determined in advance, only when the other parameter $\sigma_x(\sigma_y)$ is determined, the size (two times $\sigma_x(\sigma_y)$) of the Gabor filter is also set to determine the final Gabor filter.

Here, the thicker the blood vessels are, the higher the value of $\sigma_x(\sigma_y)$ is generally used, and the smaller the thicknesses of the blood vessels are, the smaller the $\sigma_x(\sigma_y)$ value is used.

Meanwhile, Equation 2 is the transform of Equation 1 for the frequency domain.

In this case, parameter W of Equation 2 represents frequencies of a filter, and $\sigma_u$ and $\sigma_v$ represent $1/(2\pi\sigma_x)$ and $1/(2\pi\sigma_y)$ as standard deviations in the form of a filter, respectively.

Meanwhile, FIGS. 1(a) and (b) show patterns of the spatial domain and the frequency domain of the Gabor filter, respectively.

In FIG. 1(a), the x and y axes show the x, y coordinates in Equation 1, and the vertical axis in FIG. 1(a) yields g(x,y) of Equation 1.

Also, in FIG. 1(b), the u and v axes show the u, v coordinates in Equation 2, and the vertical axis yields G(u, v) of Equation 2.

Meanwhile, FIG. 3 is a diagram showing a blood vessel image to which a Gabor filter is applied in the spatial domain and a blood vessel image in which edges are detected according to the present invention. In FIG. 3(a) that shows the original blood vessel image, a sharper blood vessel image may be obtained by selecting and applying the smallest value out of a plurality of result values, which are extracted after application of a plurality of Gabor filters in consideration of the various directions and thicknesses, compared to that obtained by subjecting the original blood vessel image to the Gabor filtering as shown in FIG. 3(b).

The edge detection step according to the present invention is performed to distinguish a blood vessel and a non-blood vessel using information on the edges of the blood vessel image. Here, a typical edge detection method used for this purpose, for example, an edge domain detection method may be used without particular limitation.

The edge detection step according to the present invention may be performed to detect edges, for example, an edge domain, according to the changes in brightness of a blood vessel and a non-blood vessel.

In particular, the edge detection step according to the present invention may be performed to detect an edge domain according to the change in brightness, which is made in the blood vessel domain and the non-blood vessel domain of the original blood vessel image and the blood vessel image in which the Gabor filtering step is completed, using an edge extraction method based on a first-order or second-order differentiation.

Here, the edges of the edge detection step may be positioned at the boundary surface between the domains where the brightness of the blood vessel and the non-blood vessel changes, using the first-order differentiation or second-order differentiation for the blood vessel image.

In particular, the edges are detected in the domains in which the changes in the brightness of the images are made according to the first-order or second-order differentiation as shown in FIG. 2.

In this case, the presence of the edges in the blood vessel image may be determined using the size of the first-order differentiated value of FIG. 2, and a symbol of the second-order differentiated value is used to determine whether the edge pixels are present in a bright domain of the edge, for example, an edge domain or present in a dark domain.

In addition, the edge extraction method used in the edge detection step may be performed using one method selected from Sobel, Prewitt, Roberts, Compass, Laplacian, Laplacian of Gaussian (LoG) or Canny.

The edge extraction method is a typical method of extracting and masking edges that is known in the art.

As an example of the edge detection step, FIG. 3 shows a blood vessel image in which edges are detected from the original blood vessel image and the blood vessel image to which a Gabor filter is applied by means of the Gabor filtering step.

In this case, FIG. 3(a) shows an original blood vessel image, FIG. 3(b) shows a blood vessel image to which a Gabor filter is applied by means of the Gabor filtering step, and FIGS. 3(c) and (d) show blood vessel images in which edges are detected in the original blood vessel image of FIG. 3(a) and the blood vessel image of FIG. 3(b) to which the Gabor filter is applied, using an edge extraction method such as Sobel 9×9 edge detection/masking.

Also, the dark domain included in the original blood vessel image of FIG. 3(a) represents a blood vessel domain, and the bright domain represents a non-blood vessel domain.

In particular, the edge detection step according to the present invention may be performed to more effectively distinguish the blood vessel domains and the non-blood vessel domains of the original blood vessel image and/or the blood vessel image which is sharpened through the Gabor filtering step. As a result, the entire obtained image, that is, the entire original blood vessel image, may be used in the edge detection step, but the entire original blood vessel image may be divided or reduced into sections having a certain size, and the edge domains may then be detected in the corresponding images so as to shorten the image processing time or serve various purposes, depending on the user's choice.

Here, the blood vessels included in the original blood vessel image vary in thicknesses. Considering that the blood vessels vary in thicknesses when the original blood vessel image is reduced to a certain size, the edge detection masks having various shapes and sizes may be used to compensate for the problem. Here, the shapes and sizes of the masks used to detect the edges are not particularly limited.

The blood vessel image sharpening step using the neural network according to the present invention is performed to fuse the original blood vessel image with the blood vessel image in which the edge detection step is completed, fuse the blood vessel image in which the Gabor filtering step is completed with the edge blood vessel image detected in the image to which the Gabor filter is applied, that is, a blood vessel image in which the Gabor filtering step is completed, determine weight values which can be applied to the pixels of the two fused images using a neural network, and then fuse the two images to sharpen the blood vessel image.

In particular, the blood vessel image sharpening step using the neural network according to the present invention may be performed to obtain a blood vessel image which is sharpened by fusing the original blood vessel image with the edge image extracted from the blood vessel image using the neural network. Therefore, several images may be used without particular limitation as long as they are fused using the neural network to improve the image quality.

Here, the neural network may use one method selected from Hopfield, cellular simultaneous recurrent network (CSRN), single-layer perceptron, multilayer perceptron), support vector regression (SVR), and support vector data description (SVDD).

In general, such a neural network is configured to realize regular patterns of an input value and an output value, and a configuration of the neural network is composed of an input layer, a hidden layer, an output layer, a weight value, a bias, an activation function, etc. Here, a plurality of nodes may be used in the input layer, the hidden layer and the output layer as the blood vessel images are sharpened and the image quality is improved, and a plurality of hidden layers and a linear activation function or various non-linear activation functions may be used herein.

Meanwhile, FIG. 4 shows a neural network having a multilayer perceptron structure, which is used to fuse the blood vessel image with the edge image detected in the blood vessel image according to the present invention.

The neural network shown in FIG. 4 is composed of four input nodes, nine hidden nodes, one output node, and a non-linear sigmoid activation function. The input of the neural network is performed by receiving averages and standard deviations of the blood vessel image and the respective edge images extracted from the blood vessel image. Then, weight values which can be applied to the fusion of the blood vessel images may be obtained by means of the neural network.

Meanwhile, prior to fusing the blood vessel images using the neural network, the average and standard deviation may be extracted in advance from the blood vessel and the non-blood vessel in the blood vessel image and the edge image undergoing the edge detection step for learning the neural network, and the optimum weight value may be determined according to the extracted average and standard deviation.

These learning data may be obtained using a method of finding the optimum pattern by repeatedly performing operations of finding a predetermined pattern of the neural network using a method of learning, a back-propagation algorithm, and reducing an error of the pattern, but the present invention is not limited thereto. As a result, the learning data may be used without limitation as long as it is obtained through the method of learning a neural network for the fusion of the blood vessel images.

FIG. 5 is a diagram showing an step of sharpening a blood vessel image using averages and standard deviations of the original blood vessel image and the image in which edges are detected using the neural network. In this case, the original blood vessel image is fused with the image in which the edges are detected using the previously learned neural network of FIG. 4.

In FIG. 5, the average and standard deviation are extracted from each of the blood vessel images using a 21×21 mask whose pixels move by one pixel unit. Here, the pixels may be used to extract a weight value from each of the original blood vessel image and the blood vessel image in which the edges are detected.

In FIG. 5, the averages and the standard deviations of the original blood vessel image and the blood vessel image in which the edges are detected are respectively represented by the parameters $m_1$, $std_1$, $m_2$ and $std_2$, which are then used as input values of the neural network.

Also, w extracted from the neural network of FIG. 5 may be used as the weight value of the central pixels of the original blood vessel image to which the 21×21 mask is applied, (1−w) may be used as a weight value of the central pixels of the blood vessel image to which the mask is applied and in which the edges are detected so as to fuse the two images. As a result, these parameters may be applied to the neural network of FIG. 5 to obtain sharpened blood vessel images.

The blood vessel image sharpening step using the score level fusion according to the present invention may be performed to sharpen the blood vessel images in which the Gabor filtering step is completed and the blood vessel image that is sharpened through the neural network using the score level fusion method.

Here, the score level fusion method may be used without particular limitation as long as it can be used to fuse the Gabor-filtered blood vessel image to the blood vessel image using the neural network. Examples of the score level fusion method that may be used herein may include at least one selected from MIN, MAX, SUM or weighted SUM.

The qualities of the blood vessel images that are sharpened using the neural network and the Gabor filter according to the present invention may be improved using a score level fusion method such as MIN, MAX, SUM and weighted SUM.

By way of example, FIGS. 6 to 9 show steps of sharpening blood vessel images, which are sharpened using the neural network and the Gabor filter, using the score level fusion methods of MIN, MAX, SUM and weighted SUM, respectively.

FIG. 6 shows an step in which the pixel values of the two images arranged in the same position are compared with each other and the blood vessel images are sharpened using the smaller value so as to fuse the two blood vessel images to which the neural network and the Gabor filter are applied.

FIG. 7 shows an operation in which the pixel values of the two images arranged in the same position are compared with each other and the blood vessel images are sharpened using the larger value so as to fuse the two blood vessel images to which the neural network and the Gabor filter are applied.

FIG. 8 shows an operation in which the blood vessel images are sharpened using an average of the pixel values of the two images arranged in the same position so as to fuse the two blood vessel images to which the neural network and the Gabor filter are applied.

FIG. 9 shows an operation in which the blood vessel images are sharpened by multiplying the pixel values of two images arranged in the same position by weight values so as to fuse the two blood vessel images to which the neural network and the Gabor filter are applied.

Meanwhile, FIG. 10 shows a plurality of blood vessel images sharpened from the original blood vessel image using a plurality of blood vessel image fusion methods according to the present invention.

In analyzing the sharpened blood vessel images shown in FIG. 10, since a signal of an invisibly thin blood vessel domain may be amplified under the influence of the Gabor filters in consideration of the plurality of directions and thicknesses as shown in FIG. 10(b), the degree of definition of the finer blood vessels compared to the original blood vessel image shown in FIG. 10(a) may be enhanced.

In addition, FIG. 10(c) shows that a non-linear sigmoid activation function used in the neural network is used not to clearly distinguish the invisibly thin blood vessel domains but to clearly distinguish the blood vessel domains in which the blood vessels are relatively thick and closely formed in one domain.

In particular, in FIG. 10(d) in which the neural network is applied through the blood vessel image in which a signal of an invisibly thin blood vessel domain is amplified by means of the Gabor filter, the blood vessel and the non-blood vessel may be distinguished in a domain in which blood vessels are densely compacted, as well as the fine blood vessel domain.

Further, the blood vessel images sharpened using the Gabor filter and the neural network may be used to accurately analyze the blood vessel and the non-blood vessel based on the blood vessel images, which reflect the characteristics of the various blood vessel images, using a combination of methods shown in FIGS. 10(e) to (h).

The method of processing a medical blood vessel image according to the present invention, configured as described, can be used to easily determine whether blood vessels in a joint are correctly connected after body incision and joint surgery of forgers, toes, hand, feet, etc. It can also be used to regularly check and observe occlusion of blood vessels by recording blood vessel images obtained under normal body conditions and comparing the blood vessel images with information on the obtained images. Also, the method according to the present invention can be used to diagnose a disease such as Buerger's disease or Raynaud's phenomenon at an early stage, as well as to diagnose a rheumatic disease at an early stage, through early findings of connective tissues, and rapidly determine whether blood vessels in the toes are occluded due to the onset of diabetes.

The method of processing a medical image of a blood vessel according to the present invention can obtain a plurality of sharpened blood vessel images from one blood vessel image using various image fusion methods, and thus may be used for accurate diagnosis and treatment by accurately analyzing a blood vessel-associated disease.

Also, the present invention can provide a blood vessel image in which a blood vessel and a non-blood vessel are distinguished clearly, and thick blood vessels as well as thin blood vessels that are difficult to distinguish due to a low degree of definition can be clearly marked.

INDUSTRIAL APPLICABILITY

The method of processing a medical image of a blood vessel according to the present invention can be useful in obtaining a plurality of sharpened blood vessel images from one blood vessel image using various image fusion methods, and thus can be used for accurate diagnosis and medical treatment of blood vessel-associated diseases.

While the invention has been shown and described with reference to certain exemplary embodiments thereof, it will be understood by those skilled in the art that various changes in form and details may be made therein without departing from the scope of the invention as defined by the appended claims.

What is claimed is:

1. A method of processing a blood vessel image, comprising:
   i) a Gabor filtering step to sharpen an original blood vessel image using a Gabor filter in consideration of various directions and thicknesses of blood vessels included in the blood vessel image;
   ii) an edge detection step to detect edges according to a change in brightness in a blood vessel domain and a non-blood vessel domain of the original blood vessel image and the blood vessel image on which the Gabor filtering step of Step i) is completed, using an edge extraction method based on a first-order differentiation or second-order differentiation;
   iii) a blood vessel image sharpening step to fuse the original blood vessel image with the blood vessel image on which the edge detection step of Step ii) is completed, fusing the blood vessel image on which the Gabor filtering step of Step i) is completed with an edge blood vessel image detected in the image to which the Gabor filter of Step ii) is applied, determining weight values which can be applied to the pixels of the two fused images using a neural network, and fusing the two images to sharpen the blood vessel image, wherein the blood vessel image sharpening step is performed using the neural network; and
   iv) a blood vessel image sharpening step to sharpen the blood vessel image on which the Gabor filtering step of Step i) is completed and the blood vessel image sharpened through the neural network of Step iii) using a score level fusion method, wherein the blood vessel image sharpening step is performed through a score level fusion.

2. The method of claim 1, following Step iv), further comprising:
   a displaying step of displaying the original image and the images obtained in Steps i) to iv) at the same time.

3. The method of claim 1, wherein the Gabor filtering step of Step i) comprises applying a plurality of Gabor filters in consideration of various directions and thicknesses according to the following Equations 1 and 2, and selecting and applying the smallest value out of a plurality of result values extracted through the plurality of Gabor filters;

$$g(x, y) = \frac{1}{2\pi\sigma_x\sigma_y}\exp\left\{-\frac{1}{2}\left(\frac{x_\theta^2}{\sigma_x^2}\right)+\left(\frac{y_\theta^2}{\sigma_y^2}\right)\right\}\{\cos(2\pi f_0 x_0)\} \quad \text{Equation 1}$$

$$\begin{pmatrix} x_\theta \\ y_\theta \end{pmatrix} = \begin{pmatrix} \cos\theta & \sin\theta \\ -\sin\theta & \cos\theta \end{pmatrix}\begin{pmatrix} x \\ y \end{pmatrix}$$

wherein (x, y) represents a position of the pixels in a filter, g(x, y) represents a Gabor filter coefficient at position (x, y), $f_0$ represents a frequency of a Gabor filter, and $\sigma_x$ and $\sigma_y$ represent parameters such as standard deviations in the form of a Gabor filter;

$$G(u, v) = \exp\left\{-\frac{1}{2}\left[\frac{(u-W)^2}{\sigma_u^2}+\frac{v^2}{\sigma_v^2}\right]\right\} \quad \text{Equation 2}$$

wherein Equation 2 is the transform of Equation 1 for the frequency domain, W represents frequencies of a filter, $\sigma_u$ and $\sigma_v$ represent $1/(2\pi\sigma_x)$ and $1/(2\pi\sigma_y)$ as standard deviations in the form of a filter, respectively.

4. The method of claim 1, wherein the edge extraction method in the edge detection step of Step ii) is performed using one method selected from Sobel, Prewitt, Roberts, Compass, Laplacian, Laplacian of Gaussian (LoG), and Canny.

5. The method of claim 1, wherein the neural network in the blood vessel image sharpening step using the neural network of Step iii) uses one method selected from Hopfield, cellular simultaneous recurrent network (CSRN), single-layer perceptron, multilayer perceptron, support vector regression (SVR), and support vector data description (SVDD).

6. The method of claim 1, wherein input of the neural network in the blood vessel image sharpening step using the neural network of Step iii), is performed using average and standard deviation in a local domain of the blood vessel image and average and standard deviation in a local domain of the blood vessel image in which the edges are detected, and output of the neural network is performed using weight values that are multiplied by the blood vessel image and the blood vessel image in which the edges are detected.

7. The method of claim 1, wherein the score level fusion in the blood vessel image sharpening step using the score level fusion of Step iv) is performed using one method selected from MIN, MAX, SUM and weighted SUM.

* * * * *

UNITED STATES PATENT AND TRADEMARK OFFICE
CERTIFICATE OF CORRECTION

PATENT NO. : 8,428,323 B2  
APPLICATION NO. : 13/519470  
DATED : April 23, 2013  
INVENTOR(S) : Sung Min Kim et al.

Page 1 of 1

It is certified that error appears in the above-identified patent and that said Letters Patent is hereby corrected as shown below:

Title Page, Column 1, Insert -- (30)   Foreign Application Priority Data  
May 16, 2011 (KR) ...........10 2011 0045782 --

Signed and Sealed this  
Twentieth Day of August, 2013

Teresa Stanek Rea  
*Acting Director of the United States Patent and Trademark Office*